(12) United States Patent
French et al.

(10) Patent No.: US 8,972,485 B1
(45) Date of Patent: Mar. 3, 2015

(54) DISTRIBUTING EXECUTION OF APPLICATIONS BETWEEN A LOCAL CLIENT SYSTEM AND A REMOTE VIRTUAL ENVIRONMENT

(75) Inventors: James P. French, Millstone Township, NJ (US); Samuel R. Carter, Jr., Ashburn, VA (US); Puze Yang, Jersey City, NJ (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 13/053,655

(22) Filed: Mar. 22, 2011

(51) Int. Cl.
*G06F 15/16* (2006.01)

(52) U.S. Cl.
USPC .......................................................... 709/203

(58) Field of Classification Search
CPC .............. G06F 9/45533; G06F 9/5077; G06F 17/30855; G06F 21/6218; G06F 2221/2149; G06F 3/1438; G06F 9/485; G06F 9/5088; G06F 9/4445; H04L 63/0227; H04L 67/1002; H04L 67/1008; H04L 67/1023; H04L 67/1031
USPC .......................................................... 709/203
See application file for complete search history.

(56) References Cited

U.S. PATENT DOCUMENTS

| 7,073,129 | B1 * | 7/2006 | Robarts et al. ................ 715/740 |
| 2007/0186212 | A1 * | 8/2007 | Mazzaferri et al. ................ 718/1 |
| 2008/0133777 | A1 * | 6/2008 | Wilkinson ..................... 709/249 |
| 2011/0184993 | A1 * | 7/2011 | Chawla et al. ................. 707/802 |
| 2011/0185292 | A1 * | 7/2011 | Chawla et al. ................. 715/760 |
| 2011/0185355 | A1 * | 7/2011 | Chawla et al. ..................... 718/1 |
| 2012/0096364 | A1 * | 4/2012 | Wilkinson et al. ............ 715/740 |
| 2012/0096365 | A1 * | 4/2012 | Wilkinson et al. ............ 715/740 |

OTHER PUBLICATIONS http://en.wikipedia.org/wiki/File_association, File Association, Dec. 26, 2010, 3 pages.
http://www.wyse.com/products/software/tex/index.asp "Wyse Virtualization Software", Wyse Technology 2 pages, retrieved from Internet Jan. 24, 2011.
http://en.wikipedia.org/wiki/Dynamic_data_exchange, Dynamic Data Exchange, Sep. 5, 2010, 3 pages.
http://en.wikipedia.org/wiki/Object_linking_and_embedding, Object Linking and Embedding, Jan. 24, 2011, 8 pages.
http://en.wikipedia.org/wiki/Desktop_Virtualization, Jan. 23, 2011, 4 pages.

* cited by examiner

*Primary Examiner* — Kevin Bates
*Assistant Examiner* — Ronak Patel
(74) *Attorney, Agent, or Firm* — Edell, Shapiro & Finnan, LLC

(57) ABSTRACT

According to one embodiment, a system comprises a computing device including at least one processor. The system detects a request to execute an application within an environment provided by the computing device. A desired environment is determined for execution of the requested application, wherein execution of applications is distributed between a local environment and one or more remote virtual environments. The local environment and one or more remote virtual environments are provided by a plurality of computing devices. The system intercepts the detected request and directs the request to a computing device among the plurality of computing devices that provides the desired environment in order to execute the requested application within the desired environment. These embodiments may further include a method and computer-readable media encoded with software for distributing execution of applications in substantially the same manner described above.

21 Claims, 10 Drawing Sheets

DISTRIBUTING EXECUTION OF APPLICATIONS BETWEEN A LOCAL CLIENT SYSTEM AND A REMOTE VIRTUAL ENVIRONMENT

TECHNICAL FIELD

The present disclosure relates to execution of applications within local and virtual environments and, more specifically, to seamlessly distributing execution of applications between a local client system and a remote virtual environment.

BACKGROUND

Virtual desktop implementations are increasing in popularity, and are commonly deployed via products from various providers (e.g., CITRIX, VMWARE, SUN, MICROSOFT, etc.). These common virtual desktop implementations rely on display protocols (e.g., MICROSOFT RDP, CITRIX ICA/HDX, SUN ALP, TERADICI PCOIP, NET2DISPLAY, etc.) that assume all applications execute on a remote virtual desktop (with no applications being executed on the client device except for a display protocol client application). However, this arrangement of application execution (e.g., execution of all applications on the remote virtual desktop) does not adequately accommodate critical rich media applications. With respect to media, the display protocols initially attempt to render video on the remote virtual desktop using crude bitmap video captures that essentially reverse the bandwidth reduction of a video encoding process. For example, an initial 300 kilobits per second (Kbps) video may be converted by the display protocols to a video in excess of 25 megabits per second (Mbps). In an attempt to address this scenario, the display protocols may support virtual channels at a session protocol layer, thereby leaving the media in the original form to be preserved and locally decoded on an endpoint client device. In other cases, the stream will be transcoded or transrated to be compatible with the decoder on the endpoint client thereby placing a heavier load on the hosted virtual desktop server farm computing and network infrastructure. The effectiveness of this approach is limited to scenarios that lack network congestion, have very high capacity computing, support media hairpinning through the data center, and have no requirements for local services like telephony services (e.g., call control, bridging or gateway functions) or Internet services/access.

DESCRIPTION OF EXAMPLE EMBODIMENTS

Overview

Figure 1:
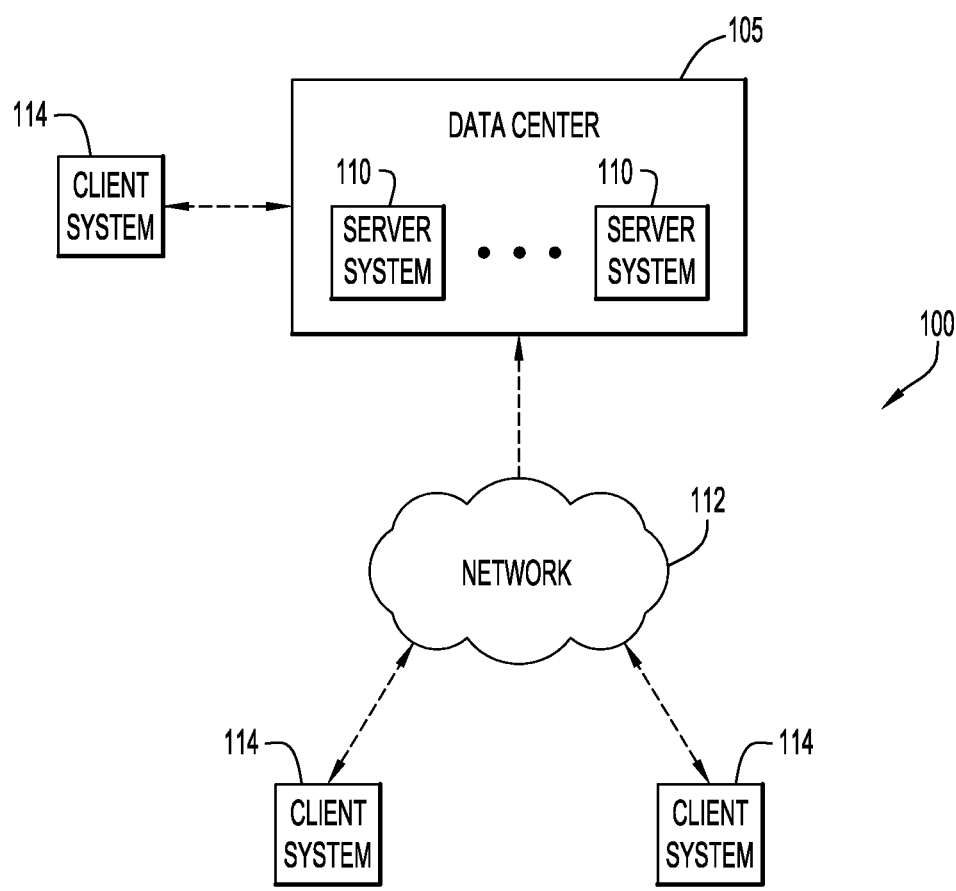
FIG. 1 is a diagrammatic illustration of an example network topology or environment for distributing execution of applications between a remote virtual environment and a client system according to an embodiment.

According to one embodiment, a system comprises a computing device including at least one processor. The system detects a request to execute an application within an execution of the requested application, wherein execution of applications is distributed between a local environment and one or more remote virtual environments. The local environment and one or more remote virtual environments are provided by a plurality of computing devices. The system intercepts the detected request and directs the request to a computing device among the plurality of computing devices that provides the desired environment in order to execute the requested application within the desired environment. Embodiments may further include a method and computer-readable media encoded with software for distributing execution of applications in substantially the same manner described above.

Example Embodiments

Embodiments described herein are directed to distributing execution of applications seamlessly between a local client system and a remote virtual environment (e.g., remote virtual desktop, one or more remote virtual applications, etc.) provided by a server or other system. Typical applications that may execute on the local client system include web browsing, IP softphone, and media player applications. The client system hardware is preferably capable to run some applications and decode media with the minimum set of applications and/or functionality, but may include any degree of functionality (e.g., may be a "thick" client system, may possess any suitable applications or degree of functionality, etc.).

The embodiments disclosed herein leverage existing network broadcast video capabilities (e.g., Quality of Service (QoS) for rich media applications) and direct peer-to-peer connections to maintain rich media applications on the local client system. Other client/server applications typically remain within the remote virtual environment to accommodate pressures for efficiency in application delivery. Rich media are commonly delivered through a media player, browser, or phone client application utilizing various protocols (e.g., Real Time Streaming Protocol (RTSP), Real Time Messaging Protocol (RTMP), Hypertext Transfer Protocol (HTTP), Hypertext Transfer Protocol Secure (HTTPS), Session Initiation Protocol (SIP), etc.). In the embodiments disclosed herein, media applications execute locally on the client system while other applications (e.g., MICROSOFT OFFICE, MICROSOFT OUTLOOK, etc.) may be provided virtually (e.g., a remote virtual application, a remote virtual desktop, etc.) from a server system of a data center. This distribution of applications is feasible since display protocols for a remote virtual environment are intended for remote office type applications.

In the embodiments disclosed herein, the local client system executes rich media applications locally, and communicates the local client application availability and media decode/encode capabilities to an agent of the remote virtual environment (e.g., remote virtual desktop, remote virtual application, etc.). The local client system has the ability to seamlessly link between locally executing applications using local Object Linking and Embedding (OLE) capability (e.g., when a local application (e.g., a softphone application) is invoked (e.g., via a hyperlink) from another local application (e.g., a local web browser)). The applications within the remote virtual environment (e.g., remote virtual desktop, remote virtual applications, etc.) may similarly utilize Object Linking and Embedding (OLE) capability (e.g., MICROSOFT WINDOWS OLE) to link between each other (e.g., when a virtual word processing application (e.g., MICROSOFT OFFICE WORD, etc.) is invoked from selection of a word processing document (e.g., MICROSOFT WORD document) attached in an electronic mail (e-mail) message (e.g., MICROSOFT OUTLOOK)). The embodiments disclosed herein virtually link together applications on the local client system and applications within the virtual environment to provide a unified desktop experience for a user.

An example network topology for distributing execution of applications between a client system and a remote virtual environment according to an embodiment is illustrated in FIG. 1. Specifically, topology 100 includes a data center 105 and one or more client or end-user systems 114. Data center 105 includes one or more server systems 110 for maintaining a remote virtual environment (e.g., generating one or more remote virtual desktops and/or hosting one or more remote virtual applications) for client systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to interact with the remote virtual environment (e.g., remote virtual desktops, remote virtual applications, etc.) provided by server systems 110 to perform various desired actions (e.g., execute various applications, such as word processors, spreadsheet applications, browsers, etc.). The client systems are preferably implemented by "thin" client devices (e.g., possess limited applications and/or functionality), but may be implemented by client devices with any degree of functionality (e.g., may be a "thick" client device, may possess any suitable applications or degree of functionality, etc.). Server systems 110 and client systems 114 include various distribution and other modules to facilitate distributing execution of applications between the server systems (e.g., providing the remote virtual environment) and client systems as described below. Client systems 114 may present a graphical user (e.g., GUI, desktop, etc.) or other interfaces (e.g., command line prompts, menu screens, etc.) to solicit information from users concerning desired actions (e.g., connecting to a remote virtual desktop, invoking applications on the client system or remote virtual environment, etc.).

Server systems 110 may be implemented by any conventional or other computer systems preferably equipped with a display or monitor, a base (e.g., including processor 240 (FIG. 2), memories 260 and/or internal or external communications devices 250 (e.g., modem, network cards, etc.)), optional input devices (e.g., a keyboard, mouse or other input device), and any commercially available and/or custom software (e.g., server/communications software, distribution modules, interface software, etc.). Client systems 114 may be implemented by any conventional or other computer systems preferably equipped with a display or monitor, a base (e.g., including processor 340 (FIG. 3), memories 360 and/or internal or external communications devices 350 (e.g., modem, network cards, etc.)), optional input devices (e.g., a keyboard, mouse or other input device), and any commercially available and/or custom software (e.g., distribution modules, browser/interface software, etc.). Alternatively, client systems 114 may further be implemented by any type of computer or processing device (e.g., laptop, personal digital assistant (PDA), mobile/cellular telephone devices, mobile devices (e.g., pads or tablets), etc.).

Figure 2:
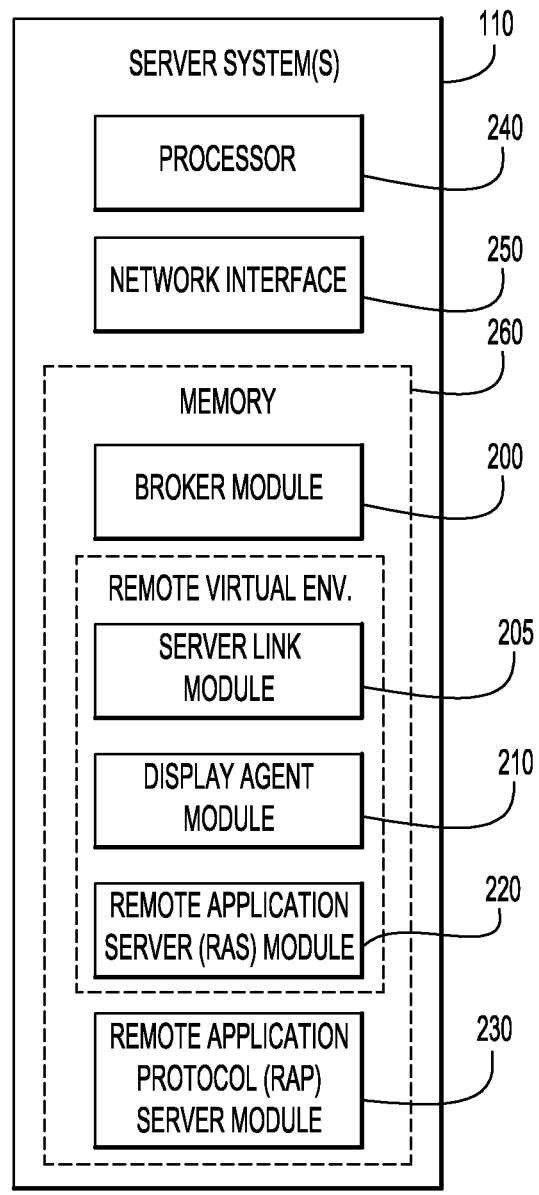
FIG. 2 is a block diagram of modules within a server system for distributing execution of applications between a remote virtual environment provided by the server system and a client system according to an embodiment.

Server system 110 includes various distribution modules to distribute execution of applications between the server systems (e.g., virtual environment including the virtual desktop and/or virtual applications) and the client system as illustrated in FIG. 2. Specifically, server system 110 includes a broker module 200, a server link module 205, a display agent module 210, a remote application server (RAS) module 220, and a remote application protocol (RAP) server module 230. Broker module 200 provides authentication of a client system 114, locates the corresponding remote virtual desktop or application within data center 105, and redirects the client system to the remote virtual desktop or application maintained by that server system. The broker module may alternatively be implemented on a separate server or other system within data center 105. Server link module 205 enables applications to link between each other within the remote virtual environment (e.g., provides an Object Linking and Embedding (OLE)/Dynamic Data Exchange (DDE) process, etc.). Display agent module 210 provides images or screens of a virtual desktop and/or virtual application for display by the client system in accordance with a display protocol (e.g., MICROSOFT RDP, CITRIX ICA/HDX, SUN ALP, TERADICI PCOIP, NET2DISPLAY, etc.). In other words, display agent module 210 sources the display protocol to provide the virtual desktop or virtual application screens on the client system. The display agent module further facilitates processing of user interactions with the displayed virtual desktop and/or virtual application. The broker, server link, and display agent modules are preferably implemented by corresponding modules within conventional remote virtual environment (e.g., remote virtual desktop and/or remote virtual application) implementations.

Server system 110 serves as the primary application processor. Accordingly, remote application server (RAS) module 220 registers, proxies, and redirects appropriate application requests or calls to either the virtual environment (e.g., remote virtual desktop, remote virtual application, etc.) or the client system as described below. The server system may include a centralized remote application server (RAS) module to handle requests for various applications, or an instance of this module for each quantity of one or more applications or an operating system. Server link module 205, display agent module 210, and remote application server (RAS) module 230 preferably operate within the remote virtual environment. Remote application protocol (RAP) server module 230 provides communication with a client system 114 in order to distribute execution of applications as described below. The remote application protocol (RAP) server module may alternatively be implemented on a different server or other system within data center 105 than the server system hosting the remote virtual environment.

Figure 3:
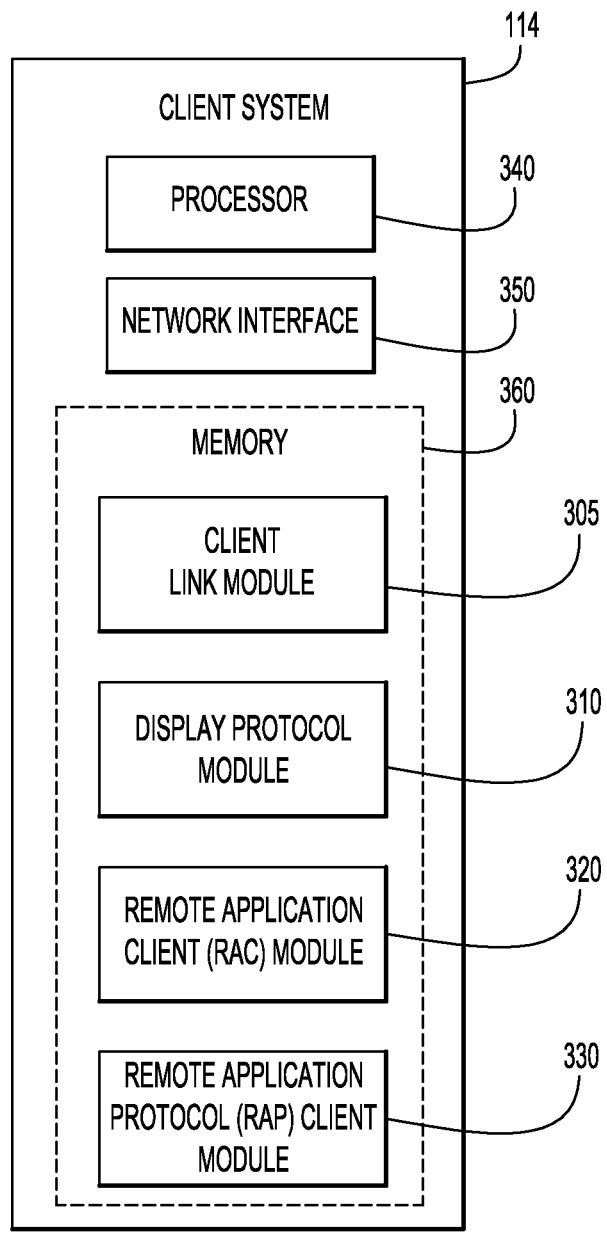
FIG. 3 is a block diagram of modules within a client system for distributing execution of applications between a remote virtual environment and the client system according to an embodiment.

Client system 114 includes various other distribution modules to distribute execution of applications between the client system and one or more server systems 110 (e.g., providing the virtual environment) as illustrated in FIG. 3. Specifically, client system 114 includes a client link module 305, a display protocol module 310, a remote application client (RAC) module 320, and a remote application protocol (RAP) client module 330. Client link module 305 enables local client applications to link between each other (e.g., provides an Object Linking and Embedding (OLE)/Dynamic Data Exchange (DDE) process, etc.). Display protocol module 310 displays on the client system the images or screens of a remote virtual desktop and/or remote virtual application received from display agent module 210 in accordance with the display protocol (e.g., MICROSOFT RDP, CITRIX ICA/HDX, SUN ALP, TERADICI PCOIP, NET2DISPLAY, etc.). The display protocol module further captures and forwards user interactions with the displayed virtual desktop and/or virtual application to the display agent module for processing. The client link and display protocol modules are preferably implemented by corresponding modules within conventional remote virtual environment (e.g., remote virtual desktop and/or remote virtual application) implementations.

The client system serves as a secondary application processor, and remote application client (RAC) module 320 registers the capabilities of the client system to the remote virtual environment (e.g., remote virtual desktop or application provided by server system 110), proxies, and redirects the appropriate application requests or calls on the client system to either server systems 110 or client system 114 as described below. The client system may include a centralized remote application client (RAC) module to handle requests for various applications, or an instance of this module for each quantity of one or more applications or an operating system. Remote application protocol (RAP) client module 330 provides communication with a server system 110 in order to distribute execution of applications as described below. The remote application protocol (RAP) server and client modules may communicate over a network connection or, alternatively, over a display protocol channel.

The various modules of the server system (e.g., broker module, server link module, display agent module, remote application server (RAS) module, remote application protocol (RAP) server module, etc.) and client system (e.g., client link module, display protocol module, remote application client (RAC) module, remote application protocol (RAP) client module, etc.) may be implemented by any combination of any quantity of software and/or hardware modules or units, and may reside within respective memories 260, 360 of those systems for execution.

Figure 4A:
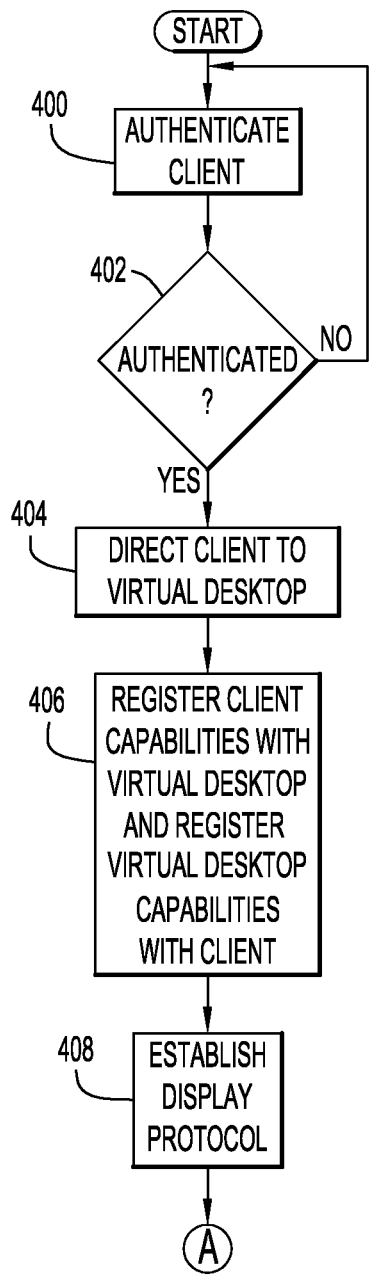
FIGS. 4A-4B are a procedural flowchart illustrating a manner in which execution of applications is distributed between a server system providing a remote virtual desktop and a client system according to an embodiment.
Figure 4B:
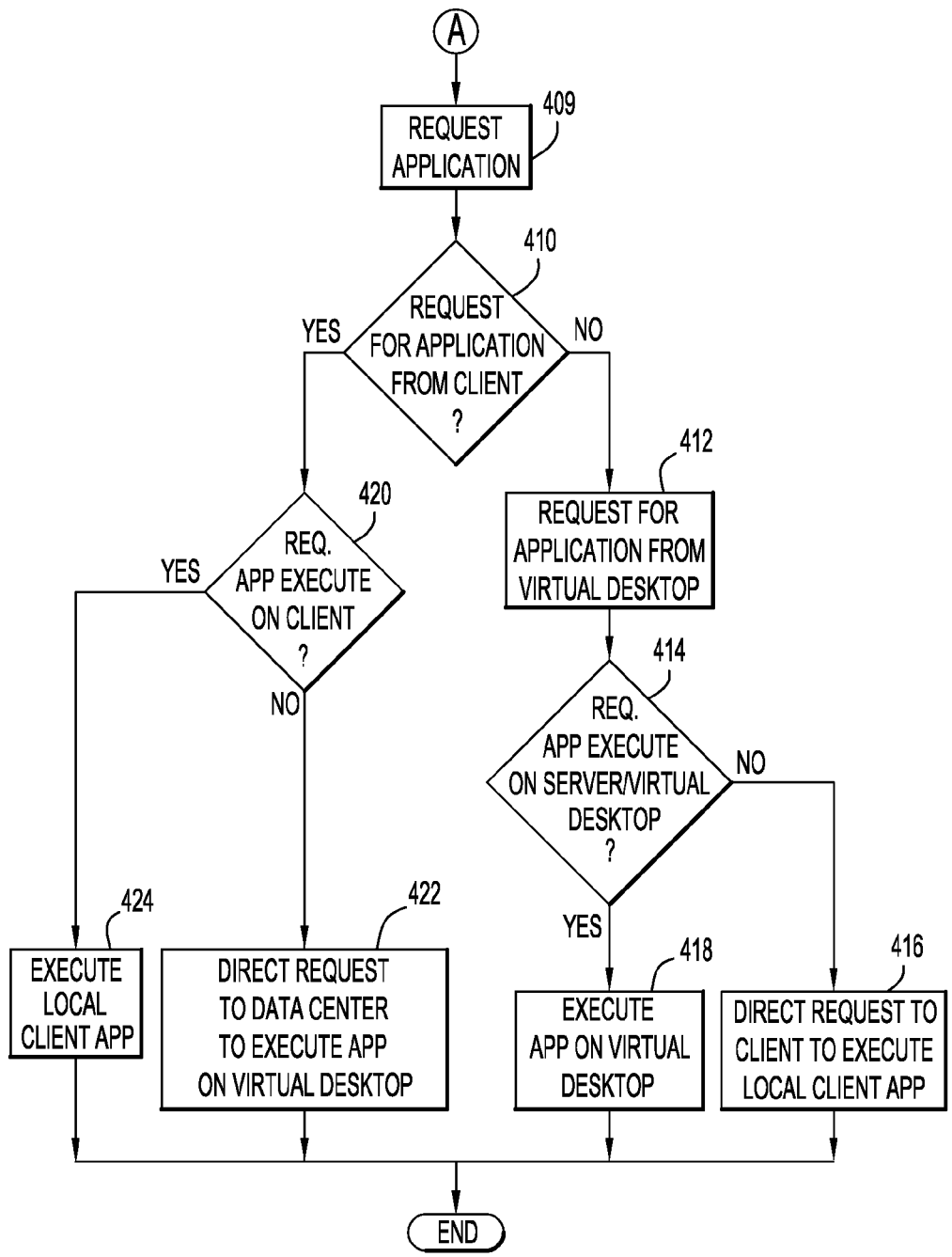

A manner in which execution of applications is distributed between a remote virtual desktop (e.g., maintained by one or more server systems 110) and client system 114 is illustrated in FIGS. 4A-4B. In particular, a client system 114 is initially authenticated to a server system 110 of data center 105 via broker module 200 at step 400 (FIG. 4A). This may be accomplished by any conventional or other techniques (e.g., login with user identification and password, PIN, encryption/decryption scheme, any other identifiers, etc.). Once the client system is authenticated as determined at step 402, the broker module determines the location of the corresponding remote virtual desktop within data center 105 (e.g., based on the information provided during the authentication), and directs the client system to that remote virtual desktop at step 404.

Client system 114 connects to server system 110 within data center 105 providing the remote virtual desktop. This may be accomplished via remote access protocol (RAP) client module 330 of the client system communicating with remote application protocol (RAP) server module 230 of the server system to establish a communication channel. Remote application client (RAC) module 320 of client system 114 provides remote application server (RAS) module 220 of server system 110 with the application and decode capabilities of the client system. The remote application server (RAS) module may provide linking information of the remote virtual desktop to the remote application client (RAC) module. Accordingly, the remote application server (RAS) module registers the applications that reside on the client system (e.g., web browser, IP phone, media player, etc.) with the operating system of the remote virtual desktop at step 406 based on the provided capabilities and administrative settings. Similarly, the remote application server (RAS) module may further register the primary applications executing on the remote virtual desktop with the client system (e.g., when the client system connects to plural remote desktops). Once the registrations have been accomplished, the display protocol (e.g., MICROSOFT RDP, CITRIX ICA/HDX, SUN ALP, TERADICI PCOIP, NET2DISPLAY, etc.) is established via display agent module 210 of server system 110 and display module 310 of client system 114 at step 408. The display protocol facilitates display and interaction with the remote virtual desktop in a conventional manner as described above.

Referring to FIG. 4B, a request for an application is initially provided by a user of client system 114 at step 409. The application request may originate from an application on the remote virtual desktop, from a local client application, or from actuation of an icon on the local and/or remote virtual desktops (e.g., a user may actuate a link within an application of the remote virtual desktop or within a local client application to invoke another application, a user may actuate an icon on the remote virtual desktop or local desktop to invoke an application, etc.).

In each of these cases, a detectable condition or event occurs in response to an application request. For example, an Object Linking and Embedding (OLE) call for the application request may be generated and intercepted on client system 114 (e.g., via client link module 305) in response to the application request originating within a local client application. Similarly, an Object Linking and Embedding (OLE) call for the application request may be generated and intercepted on server system 110 (e.g., via server link module 205) in response to the application request originating within a remote virtual desktop application.

Alternatively, application requests may be handled in a manner similar to file associations, where files are associated with particular applications. In this case, various characteristics of the file or requested application (e.g., file extension, mime type, host/domain name, etc.) and the request protocol employed (e.g., Real Time Streaming Protocol (RTSP), Hypertext Transfer Protocol (HTTP), etc.) may be utilized to intercept the application request for forwarding to the proper desired execution venue (e.g., local client system, remote virtual environment, etc.). For example, distribution modules (e.g., on server system 110 and client system 114) may collectively be registered on their respective systems as a default browser and telephony applications to enable the other applications on those systems to send application requests to the distribution modules. The distribution modules route the received application requests to the appropriate host (e.g., server system 110 or client system 114) and application as described below.

By way of further example, the distribution modules may be in the form of a browser or other application plugin that executes in the local and virtual desktop browsers. These plugins link together and apply the application distribution scheme described below to enable the browser in the best venue (e.g., server system 110 or client system 114) to execute (e.g., via browser tab resolution rather than launching the browser).

When the application request originates from the virtual desktop (e.g., the request originates from an application, or actuation of an icon, on the remote virtual desktop) as determined at steps 410 and 412, remote application server (RAS) module 220 detects the presence of the detectable condition or event (e.g., Object Linking and Embedding (OLE) call, application requests to distribution modules registered as a default application or formed as a browser/application plugin, etc.) indicating occurrence of the application request, and determines the requested application and the location of execution for that application (e.g., server system 110 for an application of the virtual desktop, or locally on client system 114 for a local client application) at step 414. In particular, a configuration file or table may be employed to indicate the applications to be executed by the remote virtual desktop (or server system 110), or locally by the client system. The configuration may be pre-defined by a system administrator or user, and may be expressed in the form of policies or rules. For example, the location of execution of an application may be based upon various criteria (e.g., the invoking application, a specified Uniform resource Locator (URL), etc.). The table may be communicated during the registration and exchange of information between the client and server systems described above (e.g., steps 406 and/or 408 (FIG. 4A)).

When the requested application (e.g., invoked from the virtual desktop) is designated for execution on client system 114 as determined at step 414, the application request is sent by remote application server (RAS) module 220 of server system 110 to remote application client (RAC) module 320 of client system 114. This may be accomplished via communication between remote application protocol (RAP) server module 230 of server system 110 and corresponding remote application protocol (RAP) client module 330 of client system 114. The remote application protocol (RAP) client module forwards the received application request to remote application client (RAC) module 320. The remote application client (RAC) module directs the application request to the instance of the requested application executing locally on the client system at step 416 in order to execute the requested application locally on the client system and accommodate the request. This enables control and other data to be passed from the remote virtual desktop to the requested local application of the client system.

If the requested application (e.g., invoked from the virtual desktop) is designated for execution on the remote virtual desktop (or server system 110) as determined at step 414, remote access server (RAS) module 230 of server system 110 directs the application request to the instance of the requested application executing on the remote virtual desktop (or server system 110) at step 418 to execute the requested application on the remote virtual desktop and accommodate the request.

When the application request originates from a local application of client system 114, or from actuation of an icon on a local desktop of the client system, as determined at step 410, remote application client (RAC) module 320 detects the presence of the detectable condition or event (e.g., Object Linking and Embedding (OLE) call, application requests to distribution modules registered as a default application or formed as a plugin, etc.) indicating occurrence of the application request, and determines the requested application and the location of execution for that application (e.g., server system 110 for an application of the virtual desktop, or locally on client system 114 for a local client application) at step 420. A configuration file or table may be employed to indicate the applications to be executed by the remote virtual desktop (or server system 110), or locally by the client system as described above. The table may be communicated during the registration and exchange of information between the client and server systems as described above (e.g., steps 406 and/or 408 (FIG. 4A)).

When the requested application (e.g., invoked locally from client system 114) is designated for execution on the virtual desktop (or by server system 110) as determined at step 420, the request is sent by remote application client (RAC) module 320 of client system 114 to remote access server (RAS) module 220 of server system 110. This may be accomplished via communication between remote application protocol (RAP) client module 330 of client system 114 and corresponding remote application protocol (RAP) server module 230 of server system 110. The remote application protocol (RAP) server module forwards the received application request to remote application server (RAS) module 220. The remote application server (RAS) module directs the application request to the instance of the requested application executing on the remote virtual desktop at step 422 in order to execute the requested application on the remote virtual desktop and accommodate the application request. This enables control and other data to be passed from the client system to the remote virtual desktop.

If the requested application (e.g., invoked locally from client system 114) is designated for execution on the client system as determined at step 420, remote application client (RAC) module 320 directs the application request to the instance of the requested application executing locally on client system 114 at step 424 in order to execute the requested application locally on the client system and accommodate the request. Accordingly, the execution of applications is essentially distributed to enable one or more applications to operate on the remote virtual desktop and other applications to operate on the local client system.

Figure 5:
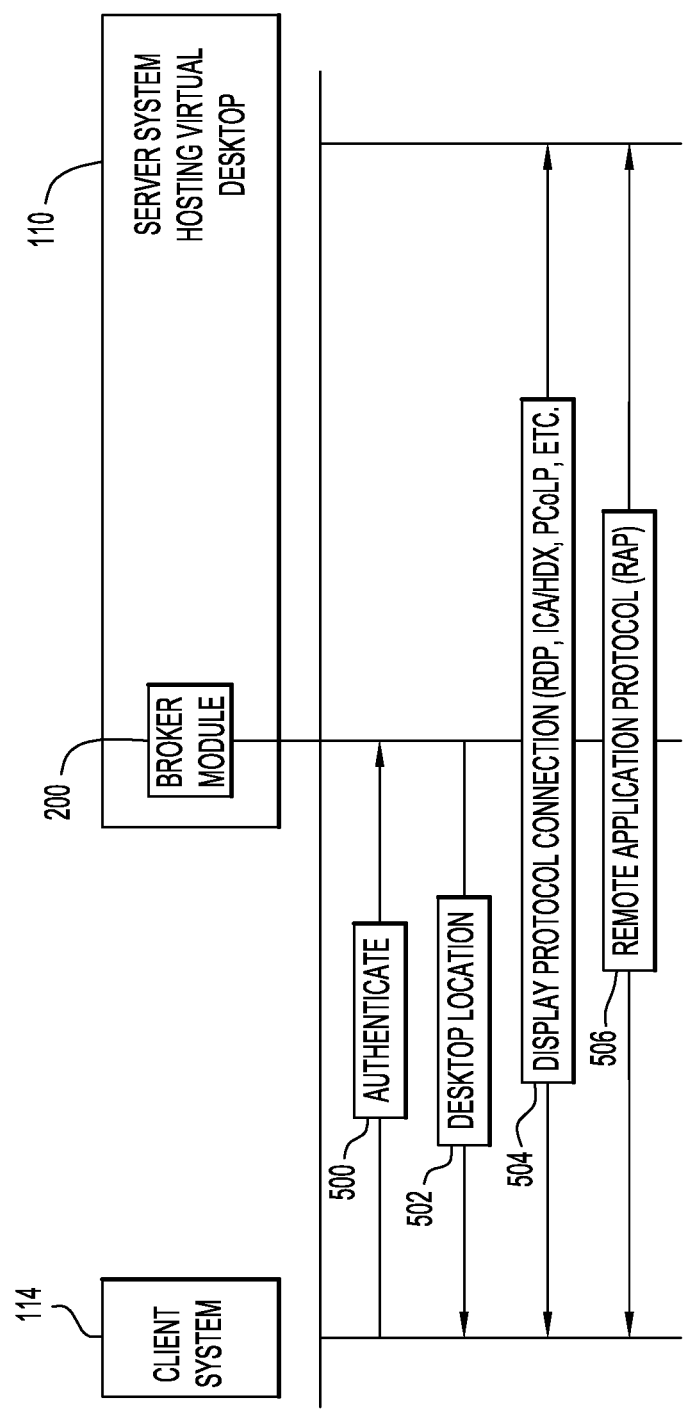
FIG. 5 is a flow diagram of the initial interaction between a server system providing a remote virtual environment and a client system in order to distribute execution of applications according to an embodiment.

Operation of one embodiment to establish protocols for distributing execution of applications is illustrated, by way of example, in FIG. 5. Initially, a client system 114 includes the distribution modules described above (e.g., client link module 305, display protocol module 310, remote application client (RAC) module 320, and remote application protocol (RAP) client module 330), and one or more local applications (e.g., softphone, browser, media player, etc.), preferably residing on an operating system (e.g., WINDOWS, ANDROID, LINUX, etc.). A remote virtual environment (e.g., remote virtual desktop, remote virtual application, etc.) is maintained by a server system 110 of data center 105. Server system 110 includes the distribution modules described above (e.g., broker module 200, server link module 205, display agent module 210, remote application server (RAS) module 220, and remote application protocol (RAP) server module 230), and one or more applications residing on the remote virtual environment (e.g., MICROSOFT OUTLOOK, MICROSOFT OFFICE, browser, etc.).

The client and server systems establish communications for transference of information. Specifically, client system 114 is initially authenticated to server system 110 via broker module 200 at flow 500. This may be accomplished by any conventional or other techniques (e.g., login with user identification and password, PIN, encryption/decryption scheme, any other identifiers, etc.) as described above. Once the client system is authenticated to the server system, the broker module determines the location of the corresponding virtual desktop or application within data center 105 (e.g., based on the information provided during the authentication), and provides the information to the client system at flow 502.

The client system connects to server system 110 within data center 105 to establish (e.g., between display agent module 210 and display protocol module 310) the display protocol (e.g., MICROSOFT RDP, CITRIX ICA/HDX, SUN ALP, TERADICI PCOIP, NET2DISPLAY, etc.) at flow 504. The remote application protocol described above for distributing execution of applications is further established (e.g., between remote application protocol (RAP) server module 220 and remote application protocol (RAP) client module 320) at flow 506.

Figure 6:
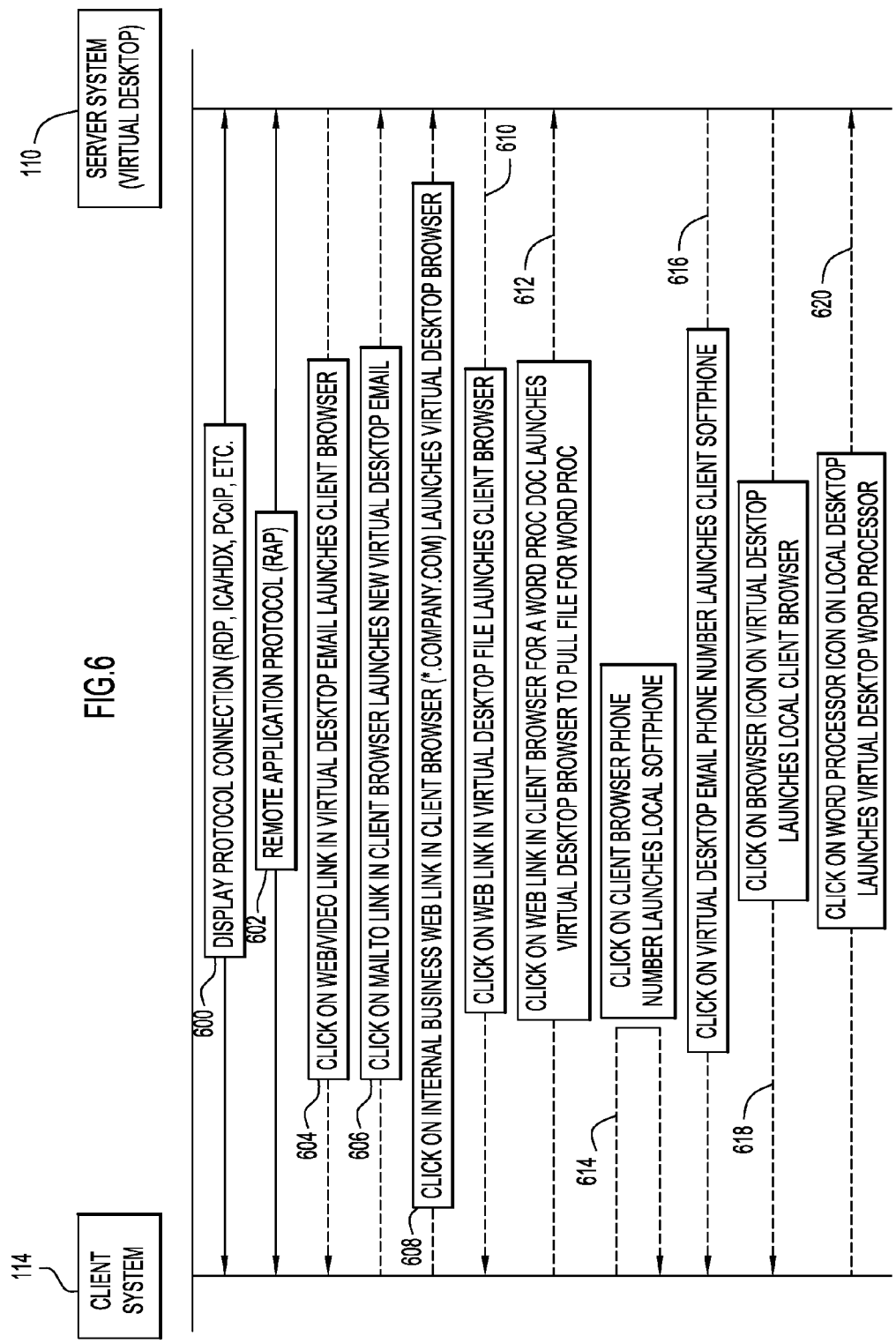
FIG. 6 is a flow diagram of a manner of distributing execution of applications between a server system providing a remote virtual desktop and a client system in response to various user actions according to an embodiment.

Operation of one embodiment for a virtual desktop and in response to various invocations of applications is illustrated, by way of example, in FIG. 6. Initially, the display protocol and remote application protocol (RAP) are established at flows 600 and 602 as described above. Once these protocols are established, various applications (e.g., local client applications, applications on the remote virtual desktop, etc.) may be invoked with their execution distributed between the client system and remote virtual desktop (or server systems 110) for enhanced performance. With respect to media, for example, the display protocols for the remote virtual desktop (e.g., MICROSOFT RDP, CITRIX ICA/HDX, SUN ALP, TERADICI PCOIP, NET2DISPLAY, etc.) initially attempt to render video using crude bitmap video captures that essentially reverse the bandwidth reduction of a video encoding process. An initial 300 kilobits per second (Kbps) video may be converted by the display protocols to a video in excess of 25 megabits per second (Mbps). This scenario is further applicable when broadcasting live rich media to many recipients. Further, several techniques for video processing, distribution, and/or streaming (e.g., FLASH, QUICKTIME, SILVERLIGHT, Content Delivery Network (CDN), infrastructure caching, infrastructure prepositioning, local client caching, etc.), and network multicast become limited or unavailable in a remote virtual desktop environment.

Accordingly, rich media may be accommodated by utilizing a local client browser, rather than attempting to render or stream the media via the remote virtual desktop. For example, a web video link may be actuated from a virtual desktop electronic mail (e-mail) or other application at flow 604. In order to enable the local client browser to accommodate the link actuation, remote application server (RAS) module 230 detects the presence of the detectable condition or event (e.g., Object Linking and Embedding (OLE) call, application requests to distribution modules registered as a default application or formed as a plugin, etc.) occurring in response to the link actuation, and sends the corresponding application request for the browser from server system 110 to client system 114. The application request is communicated over the remote application protocol (e.g., communication between the remote application protocol (RAP) server and client modules) to remote application client (RAC) module 320 on client system 114 for transference to the locally executing client browser. The local browser is executed on the client system to handle the application request.

Thus, video streams delivered within the remote virtual desktop are accommodated by the local client web browser. The local client web browser may support standalone and embedded/plug-in media player plug-ins (e.g., FLASH, VLC, WINDOWS MEDIA, QUICKTIME, REAL, SILVERLIGHT, etc.). Video is delivered in a conventional manner since the local client media player issues a Real Time Streaming Protocol (RTSP) or Real Time Messaging Protocol (RTMP) request and, thereby, may use various techniques (e.g., network multicast, a video Content Delivery Network (CDN), and Quality of Service (QoS)) to provide a good experience for the client. Linking between the local client applications and remote virtual desktop applications occurs over the remote application protocol (RAP) as described above. The local client browser may be invoked based on other link actuations within the remote virtual desktop (e.g., a web link may be actuated from a remote virtual desktop file to invoke the local client browser at flow 610, or a browser icon may be actuated from the remote virtual desktop to invoke the local client browser at flow 618) in substantially the same manner described above.

Further, these embodiments enable actuation of links for local client applications to invoke corresponding applications on the remote virtual desktop. For example, an electronic mail link, an internal business web link, or a web link for a word processing document may be actuated within a local client browser at respective flows 606, 608, and 612. In each of these example cases, the actuation of the links in the local client browser invokes a corresponding application on the remote virtual desktop (e.g., the electronic mail link invokes an electronic mail application on the remote virtual desktop, and the business and word processing links each invoke a browser on the remote virtual desktop). When a link within the local client browser is actuated, a detectable condition or event (e.g., Object Linking and Embedding (OLE) call, application requests to distribution modules registered as a default application or formed as a plugin, etc.) is generated that indicates an application request. Remote application client (RAC) module 320 detects the presence of the detectable condition or event indicating occurrence of the application request, and communicates the application request based on the link actuation over the remote application protocol (RAP) (e.g., communication between the remote application protocol (RAP) server and client modules) to remote application server (RAS) module 220 on server system 110 to invoke the corresponding application in the remote virtual desktop.

In the event the application (e.g., word processing, spreadsheet, presentation, etc.) is missing from the remote virtual desktop and when invoking documents (e.g., word processing documents, spreadsheets, presentations, etc.) via the local client web browser, the remote application server (RAS) module may provide an error or other message indicating that browser calls for these documents should be initiated from the browser on the remote virtual desktop (e.g., rather than sending an Hypertext Transfer Protocol (HTTP) request from server system 110 to client system 114 to retrieve the requested document). Applications on the remote virtual desktop may be invoked based on other link actuations within the local client system (e.g., actuation of a word processing or other icon on a local desktop at flow 620) in substantially the same manner described above.

Interactive media commonly include audio calls and calls with audio and video. These calls are typically peer-to-peer or, in other words, from one desktop to another desktop. The calls may be placed via client Internet Protocol (IP) telephones, and other types of devices (e.g., personal computer (PC) or other client devices with standalone embedded softphones (e.g., general purpose processing devices performing telephone functions via software), etc.). Current techniques direct a call between remote virtual desktops through the data center, even when the client systems presenting the remote virtual desktops for the call are local to each other. The audio of the call is tunneled inside a display protocol channel without the benefit of a network Low Latency Queue (LLQ). The call is directed through the remote virtual desktop in the data center, rather than simply remaining local between the two local client systems participating in the call.

Accordingly, round trip delay for the call is significantly higher, the bandwidth of the call is typically higher than normal due to transcoding in the remote virtual desktop, and expensive Wide Area Network (WAN) bandwidth resources are consumed. For example, in the case of a personal computer (PC) client with VMWARE VIEW and utilizing a local USB headset with a remote virtual desktop, the USB extension increases the bandwidth consumed by the commonly 64 kilobits per second (Kbps) call to 5 megabits per second (Mbps) over the network. Further, local voice services are preferred in case of network (e.g., WAN, etc.) failure. These services are not practical when the softphone executes on the remote virtual desktop since the call is directed through the data center as described above. Moreover, since media is hidden within the display protocol, the network cannot provide differentiated services (e.g., Low Latency Queuing (LLQ), etc.).

Since the softphone is executing locally on the client system, an enterprise may take advantage of local site call control, bridging, and gateway functions. The softphone executing locally on the client system preserves peer-to-peer media streams, while the client system encodes/decodes audio and video locally and directly registers with a call control server via the Session Initiation Protocol (SIP). Call Admission Control (CAC) continues to be applied using bandwidth allocations/budgets, Resource Reservation Protocol (RSVP), and Low Latency Queue (LLQ) techniques. For example, a telephone call may be invoked from a link in the local client browser at flow 614. The link actuation or telephone call generates a detectable condition or event (e.g., Object Linking and Embedding (OLE) call, application requests to distribution modules registered as a default application or formed as a plugin, etc.) that is detected by remote application client (RAC) module 320. The remote application client (RAC) module directs a corresponding application request to the local softphone application on client system 114. Thus, the call is handled locally by the client system.

Alternatively, an application on the remote virtual desktop may place a call. For example, a telephone number within an Instant Messaging (IM) or electronic mail (e-mail) application executing on the remote virtual desktop may be utilized to place a telephone call at flow 616. The call may be placed by actuating a telephone number link in a message of the Instant Messaging (IM) or electronic mail application. This action initiates a telephone call on the client system by invoking the local softphone application. In particular, remote application server (RAS) module 220 of server system 110 detects the actuation based on a detectable condition or event (e.g., Object Linking and Embedding (OLE) call, application requests to distribution modules registered as a default application or formed as a plugin, etc.), and communicates a request for the application over the remote application protocol (RAP) (e.g., communication between the remote application protocol (RAP) server and client modules) to remote application client (RAC) module 320 on client system 114. The remote application client (RAC) module directs the application request to the local client Internet Protocol (IP) softphone application. Thus, the telephone call may be handled locally on the client system.

The client system may be located external of an enterprise or other network. In this case, a system administrator or user may implement a policy in remote application server (RAS) module 220 to select either the local client application or a virtual desktop application. Further, the policy administrator may provide a policy to direct a client request coming from a Virtual Private Network (VPN) connection to use either a local client application or a remote virtual desktop application (e.g., a browser to access network content). For example, a Hypertext Transfer Protocol (HTTP) aware policy may be created that indicates the virtual desktop browser to be used for a certain Uniform Resource Locator (URL) (e.g., *.company.com), and the client browser be used for other domains.

The cost to implement a thin client system (e.g., limited functionality and/or applications) is similar to the costs to implement a thick client system (e.g., greater functionality and/or applications). In the embodiments disclosed herein, the client system has the ability to execute various applications locally (e.g., a web browser, Internet Protocol (IP) phone, media player, etc.). As a result, the client system may independently provide standalone functions (e.g., web browsing, telephone services, streaming media, etc.) even when the client system is not connected to a corporate network or a remote virtual desktop. The client system may include a thin appliance operating system (OS) (e.g., on a hypervisor) with minimal security and patching. When the client system is disconnected from the network, the user still has a personal or other computing device with sufficient processing capability for various functions (e.g., to join a virtual meeting with audio and slides, view a video, access currently stored electronic mail messages, etc.).

These embodiments are compatible with existing display protocols for WINDOWS environments (e.g., MICROSOFT RDP, CITRIX ICA/HDX, etc.) or with screen level display protocols (e.g., SUN ALP, TERADICI PCOIP, NET2DISPLAY, etc.). In some cases, the user experience may not be completely seamless. For example, if the local OS is LINUX and the remote virtual desktop is WINDOWS, then a non-WINDOWS browser (e.g. FIREFOX, CHROME, SAFARI, etc.) must be used locally. In the case of screen level display protocols that don't support screen regions, the user experience may be limited to a full desktop window delivered by the remote virtual desktop with local application windows superimposed. Most state of the market display protocols support injecting a local application window in the local desktop.

These embodiments may be employed with application virtualization (in lieu of desktop virtualization). In this case, the remote application solution (e.g., distributing execution of applications) of these embodiments enable linking between a remote virtual application (e.g., one or more instances of an application executing on a remote server or other system each corresponding to a user or invocation) and a local client application, where the remote application client (RAC) module receives application linking (e.g., Object Linking and Embedding (OLE)) information from the upstream virtual application (rather than a remote virtual desktop). The client system may be connected to many different remote virtual applications or remote virtual desktops via the display protocol (e.g., display agent module 210 and display module 310), and learns the linking (e.g., Object Linking and Embedding (OLE), etc.) state of the applications. The states are communicated to remote application server (RAS) modules 220 connected to remote application client (RAC) module 320 of the client system. This enables the remote application client (RAC) module to proxy or route linking requests from one virtual application in one virtual application environment to another application running in another virtual application environment. A remote browser does not exist in a remote hosted virtual application environment for word processing, spreadsheet, or presentation. In those cases, the only available browser resides on the local endpoint client.

Figure 7A:
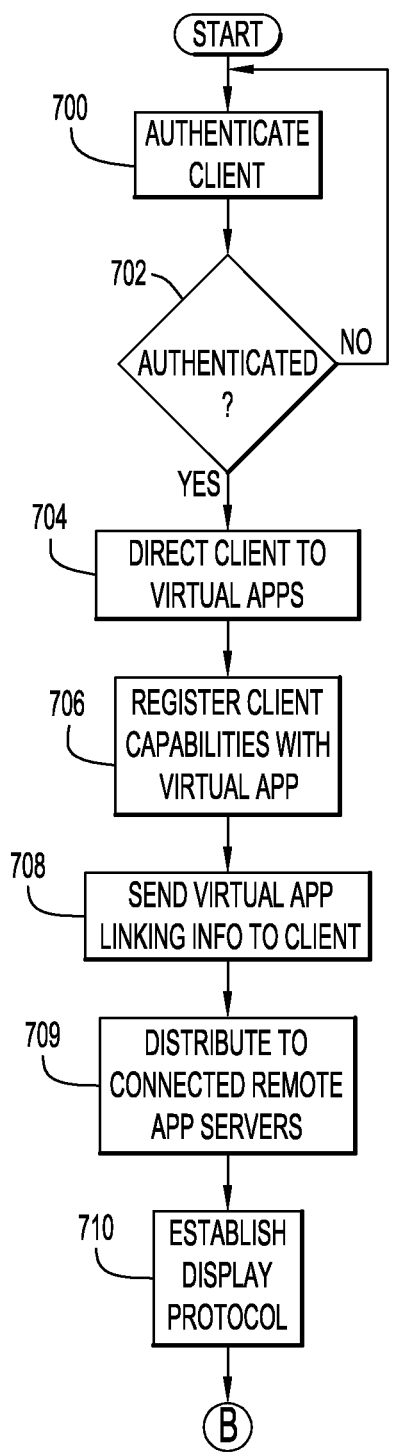
FIGS. 7A-7B are a procedural flowchart illustrating the manner in which execution of applications is distributed between a server system providing one or more virtual applications and a client system according to an embodiment.
Figure 7B:
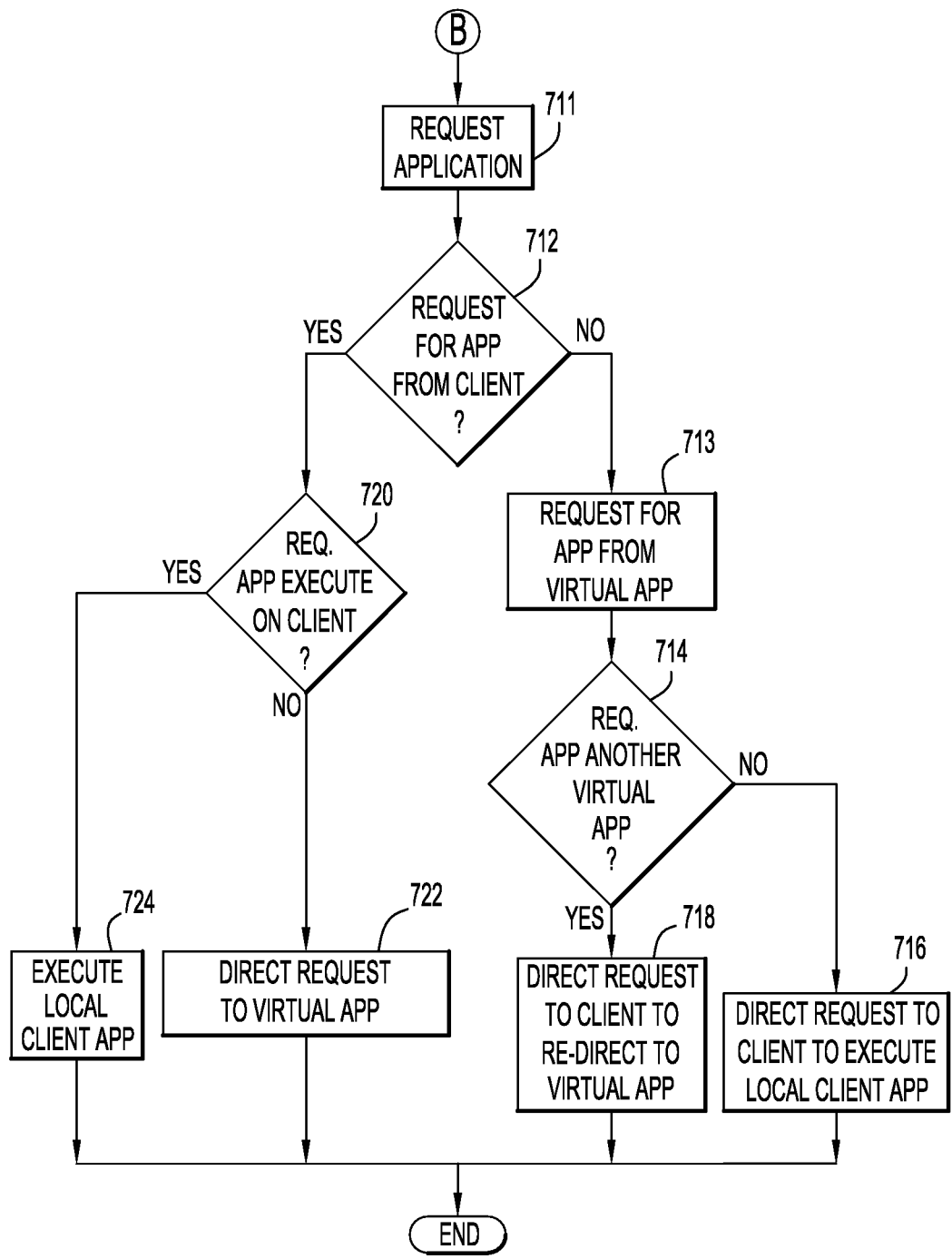

A manner in which execution of applications is distributed between virtual applications (e.g., maintained by one or more server systems 110) and client system 114 is illustrated in FIGS. 7A-7B. In particular, a client system is initially authenticated to a server system 110 of data center 105 via broker module 200 at step 700 (FIG. 7A) in substantially the same manner described above. This may be accomplished by any conventional or other techniques (e.g., login with user identification and password, PIN, encryption/decryption scheme, any other identifiers, etc.). Once the client system is authenticated as determined at step 702, the broker module determines the location of the corresponding virtual application within data center 105 (e.g., based on the information provided during the authentication), and directs the client system to that remote virtual application at step 704.

The client system connects to the server system within data center 105 providing the remote virtual application. This may be accomplished via remote access protocol (RAP) client module 330 of client system 114 communicating with remote application protocol (RAP) server module 230 of server system 110 to establish a communication channel. Remote application client (RAC) module 320 of client system 114 provides remote application server (RAS) module 220 of server system 110 with the application and decode capabilities of the client system. The remote application server (RAS) module registers the applications that reside on the client system (e.g., web browser, IP phone, media player, etc.) with the remote virtual application at step 706 based on the provided capabilities and administrative settings. Similarly, the remote application server (RAS) module may further register the virtual applications with the client system (e.g., when the client system connects to plural remote applications). The remote application server (RAS) module may further transmit linking information pertaining to the remote virtual application to remote application client (RAC) module 320 of client system 114 at step 708, where the remote application client (RAC) module distributes the information to remote application server (RAS) modules of connected server systems 110 at step 709. This enables linking of remote virtual applications within different virtual environments.

Once the registrations and information transfers have been accomplished, the display protocol connection (e.g., MICROSOFT RDP, CITRIX ICA/HDX, SUN ALP, TERADICI PCOIP, NET2DISPLAY, etc.) is established at step 710 via display agent module 210 of server system 110 and display protocol module 310 of client system 114. The display protocol facilitates display and interaction with the remote virtual application in a conventional manner as described above.

Referring to FIG. 7B, a request for an application is initially provided by a user of client system 114 at step 711. The request may originate from a virtual application, from a local client application, or from actuation of an icon from a local desktop (e.g., a user may actuate a link within a virtual or local client application to invoke another application, a user may actuate an icon from the local desktop to invoke an application, etc.). In each of these cases, a detectable condition or event (e.g., Object Linking and Embedding (OLE) call, application requests to distribution modules registered as a default application or formed as a plugin, etc.) is generated indicating the occurrence of an application request as described above.

When the application request originates from the virtual application as determined at steps 712 and 713, remote application server (RAS) module 220 detects the presence of the detectable condition or event (e.g., Object Linking and Embedding (OLE) call, application requests to distribution modules registered as a default application or formed as a plugin, etc.) indicating occurrence of the application request, and determines the requested application and the location of execution for that application (e.g., server system 110 for a virtual application, or locally on client system 114 for a local client application) at step 714. A configuration file or table may be employed to indicate the applications to be executed by server system 110, or locally by client system 114 as described above. The configuration may be pre-defined by a system administrator or user, and may be expressed in the form of policies or rules. For example, the location of execution of an application may be based upon various criteria (e.g., the invoking application, a specified Uniform resource Locator (URL), file type, mime type, etc.). The table may be communicated during the registration and exchange of information between the client and server systems described above (e.g., steps 706, 708, and/or 709 (FIG. 7A)). Policies may be based on user, group, location (e.g. VPN, enterprise intranet, etc.), etc.

When the requested application (e.g., invoked from the virtual application) is designated for execution on client system 114 as determined at step 714, the request is sent by remote application server (RAS) module 220 of server system 110 to remote application client (RAC) module 320 of client system 114. This may be accomplished via communication between remote application protocol (RAP) server module 230 of server system 110 and corresponding remote application protocol (RAP) client module 330 of client system 114. The remote application protocol (RAP) client module forwards the received application request to remote application client (RAC) module 320. The remote application client (RAC) module directs the application request to the instance of the requested application executing locally on the client system at step 716 in order to execute the requested application locally on the client system and accommodate the request. This enables control and other data to be passed from the remote virtual application to the requested local application of the client system.

If the requested application (e.g., invoked from the virtual application) is another virtual application designated for execution on one of server systems 110 as determined at step 714, remote access server (RAS) module 220 of server system 110 originating the application request sends the application request to the connected remote application client (RAC) module of client system 114. This may be accomplished via communication between remote application protocol (RAP) server module 230 of server system 110 and corresponding remote application protocol (RAP) client module 330 of client system 114. The remote application protocol (RAP) client module forwards the received request to remote application client (RAC) module 320. The remote application client (RAC) module determines server system 110 with the requested virtual application (based on the information transferred between the client and server systems as described above), and directs the application request to remote application server (RAS) module 220 of that server system (e.g., via the remote application protocol (RAP) server and client modules) at step 718. Remote application server (RAS) module 220 of server system 110 hosting the requested virtual application directs the request to the instance of the requested virtual application executing on that server system to execute the requested application on the server system and accommodate the application request.

When the application request originates from client system 114 (e.g., from a local client application or actuation of an icon on the local desktop) as determined at step 712, remote application client (RAC) module 320 detects the presence of the detectable condition or event (e.g., Object Linking and Embedding (OLE) call, application requests to distribution modules registered as a default application or formed as a plugin, etc.) indicating occurrence of the application request, and determines the requested application and the location of execution for that application (e.g., server system 110 for a virtual application, or locally on client system 114 for a local client application) at step 720. A configuration file or table may be employed to indicate the applications to be executed by server system 110, or locally by the client system as described above. The table may be communicated during the registration and exchange of information between the client and server systems as described above (e.g., steps 706, 708, and/or 709 (FIG. 7A)). The application routing table may reside on the local client, broker, remote virtual desktop, or a neutral location (e.g. remote virtual desktop file share, web server, etc.).

When the requested application (e.g., invoked locally from client system 114) is a virtual application designated for execution on server system 110 as determined at step 720, the request is sent by remote application client (RAC) module 320 of client system 114 to remote access server (RAS) module 220 of server system 110 hosting the requested virtual application. This may be accomplished via communication between remote application protocol (RAP) client module 330 of client system 114 and corresponding remote application protocol (RAP) server module 230 of server system 110. The remote application protocol (RAP) server module forwards the received application request to remote application server (RAS) module 220. The remote application server (RAS) module directs the application request to the instance of the requested virtual application executing on server system 110 at step 722 in order to execute the requested application on the server system and accommodate the application request. This enables control and other data to be passed from the client system to the remote virtual application.

If the requested application (e.g., invoked locally from client system 114) is designated for execution on the client system as determined at step 720, remote application client (RAC) module 320 directs the application request to the instance of the requested application executing locally on the client system at step 724 in order to execute the requested application locally on the client system and accommodate the request. Accordingly, the execution of applications is essentially distributed to enable one or more applications to operate on the server system and other applications to operate on the local client system.

Figure 8:
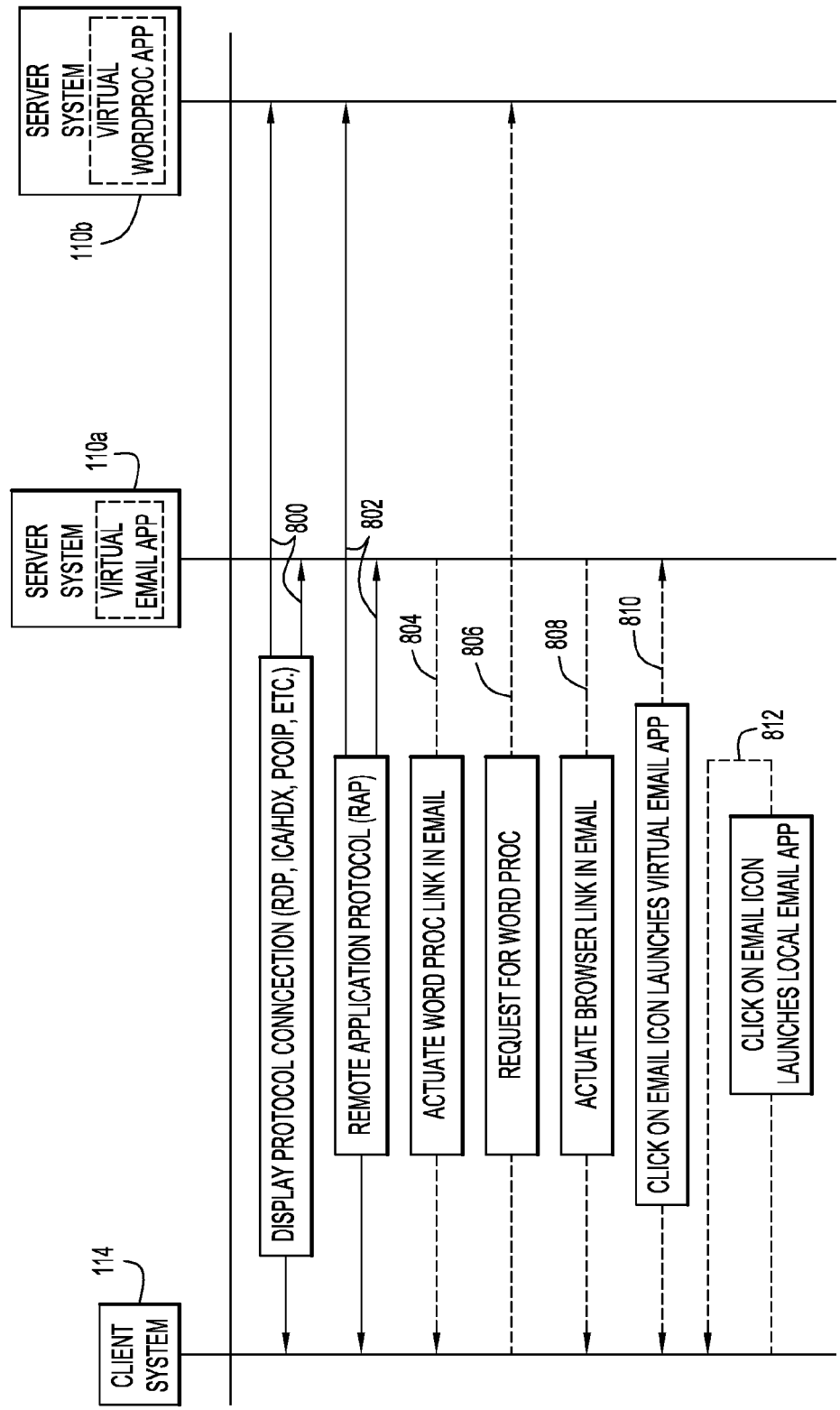
FIG. 8 is a flow diagram of a manner of distributing execution of applications between a server system providing one or more virtual applications and a client system in response to various user actions according to an embodiment.

Operation of one embodiment for virtual applications and in response to various invocations of applications is illustrated, by way of example, in FIG. 8. Initially, a client system 114 includes the distribution modules described above (e.g., client link module 305, display protocol module 310, remote application client (RAC) module 320, and remote application protocol (RAP) client module 330), and one or more local applications (e.g., softphone, browser, media player, etc.), preferably residing on an operating system (e.g., WINDOWS, ANDROID, LINUX, etc.). Server systems 110 include the distribution modules described above (e.g., broker module 200, server link module 205, display agent module 210, remote application server (RAS) module 220, remote application protocol (RAP) server module 230, etc.), and one or more virtual applications (e.g., MICROSOFT OUTLOOK, MICROSOFT OFFICE, browser, etc.).

The client and server systems establish communications for transference of information. By way of example, respective servers 110a, 110b host virtual electronic mail and word processing applications. Client system 114 is initially authenticated to server systems 110a, 110b via broker module 200. This may be accomplished by any conventional or other techniques (e.g., login with user identification and password, PIN, encryption/decryption scheme, any other identifiers, etc.) as described above. Once the client system is authenticated to the server systems, the broker module determines the location of the corresponding virtual application (on server system 110a or 100b) within data center 105 (e.g., based on the information provided during the authentication), and provides the information to the client system.

The client system connects to server systems 110a, 110b within data center 105 to establish (e.g., between display agent module 210 and display protocol module 310) the display protocol (e.g., MICROSOFT RDP, CITRIX ICA/HDX, SUN ALP, TERADICI PCOIP, NET2DISPLAY, etc.) at flows 800 and the remote application protocol (RAP) (e.g., between remote application protocol (RAP) server module 230 and remote application protocol (RAP) client module 330) at flows 802. Once these protocols are established, various applications (e.g., local client applications, virtual applications, etc.) may be invoked with their execution distributed between the client and server systems for enhanced performance.

By way of example, a user may actuate a link for a word processing document in an attachment for an electronic mail message within a virtual electronic mail application. In this case, remote application server (RAS) module 220 of server system 110a (with the virtual electronic mail application) receives the application request, and determines that a virtual word processor accommodates the application request (e.g., via the policies or tables as described above). The remote application server (RAS) module knows that the virtual word processing application exists based on the information distributed by connected remote application client (RAC) module 320 described above. The application request is sent to remote application client (RAC) module 320 of client system 114 at flow 804. The remote application client (RAC) module sends the request to server system 110b (with the virtual word processing application) at flow 806 to execute the requested application on server system 110b and accommodate the request. Thus, the application request is routed from server system 110a, over the remote application protocol (RAP) channel (e.g., communication between the remote application protocol (RAP) server and client modules) to remote application client (RAC) module 320 on client system 114. The remote application client (RAC) module forwards the application request to another server system 110b executing the virtual word processing application. Other virtual applications within the same or other server systems may be invoked based on link actuations within a virtual application in substantially the same manner described above.

By way of further example, an electronic mail message of a virtual electronic mail application may be delivered with a link for a browser. Remote application server (RAS) module 320 of server system 110a (with the virtual electronic mail application) knows that a browser to accommodate the application request from actuation of the link is located on the client system 114 (e.g., via the policies or tables as described above). Accordingly, remote application server (RAS) module 220 sends the application request from server system 110a over the remote application protocol (RAP) channel (e.g., communication between the remote application protocol (RAP) server and client modules) to client system 114 at flow

808 to accommodate the request and execute the local browser on the client system. Other applications on the client system may be invoked from virtual applications in substantially the same manner described above.

Further, requests for applications generated from the local desktop may be directed to either the local client application or remote virtual application. For example, a user may actuate a link for an electronic mail application on a local client desktop, where the electronic mail application is designated as a virtual application for execution on server system 110*a*. A detectable condition or event (e.g., Object Linking and Embedding (OLE) call, application requests to distribution modules registered as a default application or formed as a plugin, etc.) is detected by remote application client (RAC) module 320 of client system 114. The remote application client (RAC) module determines that the requested application is a virtual application to be executed on server system 110*a* (e.g., via the policies or tables as described above), and an application request based on the link actuation is communicated over the remote application protocol (RAP) (e.g., communication between the remote application protocol (RAP) server and client modules) to remote application server (RAS) module 220 on server system 110*a* (with the remote virtual electronic mail application) at flow 810. The remote application server (RAS) module forwards the application request to the instance of the requested application executing on server system 110*a* to execute the requested application on server system 110*a* and accommodate the request.

By way of further example, a user may actuate a link for an electronic mail application on a local client desktop, where the electronic mail application is designated as a local client application for execution on client system 114. A detectable condition or event (e.g., Object Linking and Embedding (OLE) call, application requests to distribution modules registered as a default application or formed as a plugin, etc.) is detected by remote application client (RAC) module 320 of client system 114. The remote application client (RAC) module determines that the requested application is a local client application to be executed on client system 114 (e.g., via the policies or tables as described above), and directs the application request to the local electronic mail application on client system 114 to execute the requested application locally on the client system and accommodate the request.

The remote application client (RAC) and remote application server (RAS) modules may be executed on a variety of client and server operating systems (e.g., WINDOWS, WINDOWS MOBILE, LINUX, MACOS, IOS, ANDROID, etc). These embodiments normalize the remote virtual desktop linking interface with the local client linking interface, thereby providing translation between disparate environments. Software As A Service (SAAS) or cloud vendors may leverage the techniques of present embodiments for an enhanced user experience.

Further, these embodiments enable the user to retain and leverage the current rich media infrastructure and multicast network, while providing the centralization of non-rich media applications. Moreover, these embodiments may be embedded in desktop devices that may replace the desktop personal computer (PC) and other telephones with a single converged device providing an integrated instant-on notebook and Internet Protocol (IP) phone.

Enterprise organizations may utilize these embodiments to increase the standalone value of a thin client device by implementing local web browsing and telephone in a desktop device, while other non-rich media applications (e.g., traditional client/server applications) execute remotely in the data center. Service providers may offer a notebook and telephone service for the consumer market, and offer full desktop services (when needed and on demand) seamlessly, while still providing value for the standalone endpoint device.

It will be appreciated that the embodiments described above and illustrated in the drawings represent only a few of the many ways of implementing embodiments for distributing execution of applications between a local client system and a remote virtual environment.

The topology or environment of the present embodiments may include any number of computer or other processing systems (e.g., client or end-user systems, server systems, etc.) arranged in any desired fashion, where these embodiments may be applied to any desired type of computing environment (e.g., cloud computing, client-server, network computing, etc.). The computer or other processing systems (e.g., client systems, server systems, etc.) employed by these embodiments may be implemented by any number of any personal or other type of computer or processing system (e.g., IBM-compatible, APPLE, laptop, tablets, etc.), and may include any commercially available operating system and any commercially available or custom software (e.g., browser software, communications software, server software, distribution modules, etc.). These systems may include any types of monitors and input devices (e.g., keyboard, mouse, voice recognition, touch screen, etc.) to enter and/or view information. In addition, the client systems may be implemented by any personal or other type of computer or processing device (e.g., laptop, notebook, personal or other computer system, personal digital assistant (PDA), mobile/cellular telephones, mobile computing devices (e.g., pads, tablets, etc.)).

It is to be understood that the software (e.g., distribution modules including the broker module, server link module, display agent module, remote application server (RAS) module, remote application protocol (RAP) server module, client link module, display protocol module, remote application client (RAC) module, remote application protocol (RAP) client module, etc.) of the present embodiments may be implemented in any desired computer language and could be developed by one of ordinary skill in the computer arts based on the functional descriptions contained in the specification and flow charts and/or diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts and/or diagrams may be modified in any manner that accomplishes the functions described herein. In addition, the functions in the flow charts and/or diagrams or description may be performed in any order that accomplishes a desired operation.

The software of the present embodiments (e.g., distribution modules including the broker module, server link module, display agent module, remote application server (RAS) module, remote application protocol (RAP) server module, client link module, display protocol module, remote application client (RAC) module, remote application protocol (RAP) client module, etc.) may be made available as a program product apparatus or device including a recordable or computer usable or readable medium (e.g., magnetic or optical mediums, magneto-optic mediums, floppy diskettes, CD-ROM, DVD, memory devices, etc.) for use on standalone systems or systems connected by a network or other communications medium, and/or may be downloaded (e.g., in the form of carrier waves, packets, etc.) to systems via a network or other communications medium.

Further, the memories of the computer systems or devices of present embodiments may comprise read only memory (ROM), random access memory (RAM), magnetic disk storage media devices, optical storage media devices, flash memory devices, electrical, optical, or other physical/tangible memory storage devices. Thus, in general, the memory may comprise one or more computer readable storage media (e.g., a memory device) encoded with software or logic comprising computer executable instructions and, when executed (by the corresponding processor of the computer system or device), the software is operable to perform the operations described herein.

The communication network may be implemented by any number of any type of communications network (e.g., LAN, WAN, Internet, Intranet, VPN, etc.). The computer or other processing systems of these embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

These embodiments may employ any number of any conventional or other databases, data stores or storage structures (e.g., files, databases, data structures, data or other repositories, etc.) to store information. A database system may be included within or coupled to the server and/or client systems. The database system and/or storage structure may be remote from or local to the computer or other processing systems, and may store any desired data.

These embodiments may distribute execution of any quantity of any types of applications or other procedural instructions (e.g., computer programs, routines, macros, libraries, scripts, patches, etc.) between a virtual environment and a client system. Further, present embodiments may distribute execution of any quantity of components of any types of applications or other procedural instructions (e.g., computer programs, routines, macros, libraries, scripts, patches, etc.) between a virtual environment and a client system. For example, an application component in the form of a new e-mail or new browser tab may be distributed for execution between a virtual environment and a client system. The virtual environment may include any type of environment providing a local or remote virtual service or task (e.g., one or more virtual applications, a virtual desktop, a virtual machine, a virtual tablet, a virtual gaming console, a web application, etc.), while the applications may include any type of application (e.g., word processing, media, browser, communication, etc.).

The execution of applications (or components) may be distributed in any desired fashion between one or more virtual environments and one or more client systems (e.g., any quantity of applications (or components) may be distributed to server and client systems based on any desired criteria (e.g., processing load, quality of output, processing efficiency or speed, etc.)). The distribution may be pre-configured or determined dynamically based on any desired criteria. The rules or policies may be of any desired form, and include any desired criteria (e.g., URL, user name or ID, system characteristics, location, file type, mime type, etc.) for determining a venue for execution. The tables may designate venues for applications in any desired fashion, and may utilize any desired format. The tables may be implemented by any suitable data structure (e.g., arrays, lists, etc.). Further, these embodiments may be utilized to distribute execution of any applications or other procedural instructions across any computing systems, devices, and/or operating systems. Moreover, the remote application client (RAC) and remote application server (RAS) modules may be centralized to handle requests for various applications, or the server and client systems may include an instance of these modules for each quantity of one or more applications or an operating system.

The requests for applications may be detected and/or intercepted in any desired fashion (e.g., calls, file associations, etc.) in order to re-direct the requests to the desired venue. For example, the application request may be detected based on Object Linking and Embedding (OLE) or other calls. Further, the distribution modules (e.g., on the server and client systems) may collectively be registered on their respective systems as a default application to enable application requests to be sent to the distribution modules for routing to the desired venue. Moreover, the distribution modules may be in the form of application plugins (e.g., for applications on the client and server systems) that link together to enable a requested application to execute in a desired venue. The requests for applications may originate from any venue (e.g., local client system, server systems (e.g., virtual or other environment), etc.), and be generated in response to any suitable actions (e.g., actuation of links or icons within desktops or applications, calls from applications, operating systems or other environments, launches from any suitable interfaces (e.g., GUI, line or command prompt, etc.) or in response to any commands, etc.). In addition, the remote application protocol (RAP) (e.g., remote application protocol (RAP) server and client modules, etc.) may utilize a network connection for communication or, alternatively, utilize a display protocol channel for communication.

It will be understood that the terms "comprises", "comprising", "includes", "including", "has", "have", "having", "with" and the like, when used in this specification and the claims, specify the presence of stated features, but do not preclude the presence or addition of one or more other features.

From the foregoing description, it will be appreciated that the techniques disclosed herein make available novel embodiments for distributing execution of applications between a local client system and a remote virtual environment, wherein execution of applications is seamlessly distributed between a local client system and a remote virtual environment.

Having described example embodiments of a new and improved technique for distributing execution of applications between a local client system and a remote virtual environment, it is believed that other modifications, variations and changes will be suggested to those skilled in the art in view of the teachings set forth herein. It is therefore to be understood that all such variations, modifications and changes are believed to fall within the scope as defined by the appended claims.

What is claimed is:

1. A method comprising:

detecting a request from a user of a client device to execute an application, the request originating from a local environment provided by the client device;

determining a desired environment for execution of said application based upon criteria specific to execution of said application, wherein execution of applications is distributed between the local environment provided by the client device and one or more remote virtual environments provided by one or more server devices, and wherein execution of applications is distributed according to configuration information based upon the determined desired environments for applications indicating that applications of a first type are to be executed in the local environment and that applications of a second type are to be executed in any of the one or more remote virtual environments, and wherein the configuration information comprises one or more rules constructed to select the local environment for applications comprising content rich media delivered through a media player, web browser or phone client application, and to select one of the remote virtual environments for applications not comprising content rich media;

executing the application in the local environment provided by the client device in response to determining that the application is of the first type designated by the configuration information to be executed in the local environment; and directing said request to one of the server devices for execution in response to determining that the application is of the second type designated by the configuration information to be executed in a remote virtual environment of said one of the server devices.

2. The method of claim 1, wherein the remote virtual environment of said one of the server devices includes one of a remote virtual desktop, remote virtual tablet, remote virtual gaming console, and a remote web application.

3. The method of claim 1, wherein the remote virtual environment of said one of the server devices includes one or more remote virtual applications, and wherein said application includes one of said remote virtual applications.

4. The method of claim 1, wherein said detecting said request includes:

detecting said request originating from an application on said computing device detecting said request.

5. The method of claim 1, wherein said detecting said request includes:

detecting said request originating from a desktop presented on said computing device detecting said request.

6. A system comprising:

a client device including at least one processor configured to:

detect a request from a user to execute an application, the request originating from a local environment provided by the client device;

determine a desired environment for execution of said application based upon criteria specific to execution of said application, wherein execution of applications is distributed between the local environment provided by the client device and one or more remote virtual environments provided by one or more server devices, and wherein execution of applications is distributed, based upon criteria specific to execution of the application, according to configuration information based upon the determined desired environments for applications indicating that applications of a first type are to be executed in the local environment and that applications of a second type are to be executed in any of the one or more remote virtual environments, and wherein the configuration information comprises one or more rules constructed to select the local environment for applications comprising content rich media delivered through a media player, web browser or phone client application, and to select one of the remote virtual environments for applications not comprising content rich media;

execute the application in the local environment provided by the client device in response to a determination that the application is of the first type designated by the configuration information to be executed in the local environment; and direct said request to one of the server devices for execution in response to a determination that the application is of the second type designated by the configuration information to be executed in a remote virtual environment of said one of the server devices.

7. The system of claim 6, wherein the remote virtual environment of said one of the server devices includes one of a remote virtual desktop, remote virtual tablet, remote virtual gaming console, and a remote web application.

8. The system of claim 6, wherein the remote virtual environment of said one of the server devices includes one or more remote virtual applications, and wherein said application includes one of said remote virtual applications.

9. The system of claim 6, wherein the processor of the client device detects said request by:

detecting said request originating from an application on said computing device.

10. The system of claim 6, wherein the processor of the client device detects said request by:

detecting said request originating from a desktop presented on said computing device.

11. Software encoded in one or more non-transitory computer-readable media and when executed operable to:

detect a request from a user of a client device to execute an application, the request originating from a local environment provided by the client device;

determine a desired environment for execution of said application based upon criteria specific to execution of said application, wherein execution of applications is distributed between the local environment provided by the client device and one or more remote virtual environments provided by one or more server devices, and wherein execution of applications is distributed according to configuration information based upon the determined desired environments for applications indicating that applications of a first type are to be executed in the local environment and that applications of a second type are to be executed in any of the one or more remote virtual environments, and wherein the configuration information comprises one or more rules constructed to select the local environment for applications comprising content rich media delivered through a media player, web browser or phone client application, and to select one of the remote virtual environments for applications not comprising content rich media;

execute the application in the local environment provided by the client device in response to determining that the application is of the first type designated by the configuration information to be executed in the local environment; and direct said request to one of the server devices for execution in response to determining that the application is of the second type designated by the configuration information to be executed in a remote virtual environment of said one of the server devices.

12. The non-transitory computer-readable media of claim 11, wherein the remote virtual environment of said one of the server devices includes one of a remote virtual desktop, remote virtual tablet, remote virtual gaming console, and a remote web application.

13. The non-transitory computer-readable media of claim 11, wherein the remote virtual environment of said one of the server devices includes one or more remote virtual applications, and wherein said application includes one of said remote virtual applications.

14. The non-transitory computer-readable media of claim 11, wherein the software is operable to detect said request by:
detecting said request originating from an application on said computing device detecting said request.

15. The non-transitory computer-readable media of claim 11, wherein the software is operable to detect said request by:
detecting said request originating from a desktop presented on said computing device detecting said request.

16. The method of claim 1, further comprising:
providing local client application availability and media decode/encode capabilities to an agent of the remote virtual environment.

17. The system of claim 6, further comprising at least one processor configured to provide local client application availability and media decode/encode capabilities to an agent of the remote virtual environment.

18. The non-transitory computer-readable media of claim 11, wherein the software is further operable for:
providing local client application availability and media decode/encode capabilities to an agent of the remote virtual environment.

19. The method of claim 1, wherein the content rich media is delivered according to a web-based protocol or a media-based streaming protocol.

20. The system of claim 6, wherein the content rich media is delivered according to a web-based protocol or a media-based streaming protocol.

21. The non-transitory computer-readable media of claim 11, wherein the content rich media is delivered according to a web-based protocol or a media-based streaming protocol.

* * * * *